(12) United States Patent
Lee (10) Patent No.: US 11,679,652 B2
(45) Date of Patent: Jun. 20, 2023

(54) VEHICLE DOOR OPENING STRUCTURE

(71) Applicants: Hyundai Motor Company, Seoul (KR); Kia Corporation, Seoul (KR)

(72) Inventor: Jae Seung Lee, Hwaseong-si (KR)

(73) Assignees: Hyundai Motor Company, Seoul (KR); Kia Corporotion, Seoul (KR)

( * ) Notice: Subject to any disclaimer, the term of this patent is extended or adjusted under 35 U.S.C. 154(b) by 99 days.

(21) Appl. No.: 17/381,719

(22) Filed: Jul. 21, 2021

(65) Prior Publication Data

US 2022/0220786 A1  Jul. 14, 2022

(30) Foreign Application Priority Data

Jan. 12, 2021  (KR) .................. 10-2021-0003657

(51) Int. Cl.
  *B60J 5/04*  (2006.01)
  *B60P 1/43*  (2006.01)
  *E05F 17/00*  (2006.01)

(52) U.S. Cl.
  CPC .............. *B60J 5/047* (2013.01); *B60P 1/435* (2013.01); *E05F 17/004* (2013.01); *E05Y 2201/434* (2013.01); *E05Y 2201/684* (2013.01); *E05Y 2201/702* (2013.01); *E05Y 2400/45* (2013.01); *E05Y 2800/102* (2013.01); *E05Y 2900/516* (2013.01)

(58) Field of Classification Search
  CPC ...... B60J 5/0477; B60J 5/0473; B60J 5/0479; B60J 5/104; B60J 5/12; B60J 5/125; B60J 5/047; B60P 1/435; E05B 83/38; E05B 83/40; E05D 15/48

USPC ................................................ 296/146.4, 155
  See application file for complete search history.

(56) References Cited

U.S. PATENT DOCUMENTS

| | | | | |
|---|---|---|---|---|
| 5,688,004 A | * | 11/1997 | Karge | E05B 85/247 |
| | | | | 292/201 |
| 8,174,146 B2 | * | 5/2012 | Cheal | E05F 15/77 |
| | | | | 296/146.4 |
| 8,740,279 B1 | * | 6/2014 | McGoff | B62D 33/0273 |
| | | | | 49/168 |
| 9,079,478 B1 | * | 7/2015 | Hirneise | B60J 5/06 |
| 10,358,172 B2 | * | 7/2019 | Morley | B62D 33/0273 |
| 11,220,852 B2 | * | 1/2022 | Groninga | B64C 27/04 |
| 11,472,326 B1 | * | 10/2022 | Nageshkar | B60P 1/435 |
| 11,505,261 B2 | * | 11/2022 | Van Norman | B62D 33/037 |
| 2006/0197357 A1 | * | 9/2006 | Catania | E05D 15/58 |
| | | | | 296/155 |
| 2012/0324793 A1 | * | 12/2012 | Abbasi | B62D 33/0273 |
| | | | | 49/168 |

(Continued)

FOREIGN PATENT DOCUMENTS

KR   20090043127 A   5/2009

*Primary Examiner* — Jason S Morrow
(74) *Attorney, Agent, or Firm* — Slater Matsil, LLP (57) ABSTRACT

An embodiment vehicle door opening structure includes a first door unit positioned at a side of a vehicle and including a first door, a second door unit including a second door positioned adjacent to the first door, a locking device configured to selectively lock the first door unit and the second door unit together, and a controller configured to fix the locking device so that the first door unit and the second door unit are configured to be opened together or to release the locking device so that the first door unit and the second door unit are configured to be opened independently.

20 Claims, 7 Drawing Sheets

(56) References Cited

U.S. PATENT DOCUMENTS

| | | | |
|---|---|---|---|
| 2022/0047436 A1* | 2/2022 | Saucier | B60P 1/435 |
| 2022/0242202 A1* | 8/2022 | Murata | B60J 5/0497 |
| 2022/0268079 A1* | 8/2022 | Ishida | B60P 1/431 |
| 2022/0289091 A1* | 9/2022 | Sakurai | B60J 5/062 |
| 2022/0316258 A1* | 10/2022 | Pulikonda | B62D 33/0273 |
| 2022/0371667 A1* | 11/2022 | Hemphill | B62D 33/0273 |
| 2022/0381067 A1* | 12/2022 | Noiri | E05B 81/20 |
| 2022/0381068 A1* | 12/2022 | Heins | E05B 79/08 |
| 2022/0389746 A1* | 12/2022 | Nishi | B60J 5/062 |

* cited by examiner

[ A-A cross-section ]

FIG. 1C

[ B-B cross-section ]

[ B-B cross-section ]

[ D-D cross-section ]

FIG. 5B

[ C-C cross-section ]

VEHICLE DOOR OPENING STRUCTURE

CROSS-REFERENCE TO RELATED APPLICATIONS

This application claims the benefit of Korean Patent Application No. 10-2021-0003657, filed on Jan. 12, 2021, which application is hereby incorporated herein by reference.

TECHNICAL FIELD

The present disclosure relates to a vehicle door opening structure.

BACKGROUND

There are several types of doors for vehicles. Among the types of doors for vehicles, a swing type door that is mainly applied to a passenger car, a sliding type door that is mainly applied to a midsize van, and a hatchback type door that is mainly applied to a tail door of a van and Recreational Vehicle (RV) are exemplified.

On the other hand, a Purpose Built Vehicle (PBV), which extends living space, is emerging as a mobility of the future. For example, if PBVs respectively configured as a shoe shop and a clothing store are docked to a hub, the hub becomes a shopping center. Extensibility of a function and design according to the purpose of the PBV is substantially large. The PBV is a new type of mobility, which is not a private vehicle or a bus, and is used as a flexible space where the purpose of a hub is changed depending on the purpose of the PBV that is docked on the hub.

To use the PBV more efficiently, there is a need for an opening structure of a door that is diversified in accordance with surroundings, and further, there is a need for an opening structure of a lower door suitable for a situation.

In addition, for a conventional door which is provided with a door ramp, a separate space on an underfloor into which the ramp is to be inserted is needed for a ramp storage space configured separately from the door.

Korean Patent Application Publication No. 10-2009-0043127 describes information related to the present subject matter.

SUMMARY

The present disclosure relates to a vehicle door opening structure. Particular embodiments relate to a vehicle door opening structure, which provides a second door performing a ramp function, and allows a first door unit and a second door unit of the door opening structure to be opened in a state of being selectively fastened together.

Accordingly, embodiments of the present disclosure consider problems occurring in the related art, and embodiments of the present disclosure provide a second door that is capable of being opened in various types.

In addition, embodiments of the present disclosure provide a structure in which a second door is configured to be selectively opened and closed relative to a first door so that the second door is selectively rotated open in order to provide a sloped surface to a bottom surface of a vehicle body so as to perform a ramp function.

Features of embodiments of the present disclosure are not limited to the aforementioned features and other features and advantages of embodiments of the present disclosure which are not mentioned can be appreciated by the following description and will be made more apparent by the exemplary embodiments of the present disclosure. Further, embodiments of the present disclosure may be implemented by means represented in the scope of the exemplary embodiments of the present disclosure and combinations thereof.

According to one embodiment of the present disclosure, there is provided a vehicle door opening structure including a first door unit positioned at at least one side of a vehicle and including a first door, a second door unit including a second door positioned adjacent to the first door, a locking unit positioned such that the first door unit and the second door unit are selectively locked together, and a control unit configured to fix the locking unit so that the first door unit and the second door unit are opened together, or to release the locking unit so that the first door unit and the second door unit are opened independently.

In addition, the first door unit may further include a driving unit fastened to the first door and configured to perform a movement in a longitudinal direction of the driving unit.

In addition, the driving unit may further include a spindle positioned at a vehicle body and of which a first end is fastened to a rear surface of the first door and a fixing portion configured such that the spindle is fixed to the first door.

In addition, in the vehicle door opening structure, the first door and the second door may be configured to be opened together when the driving unit is driven while the locking unit is in a locked state.

In addition, in the vehicle door opening structure, the first door may be configured to be independently opened when the driving unit is driven while the locking unit is in a released state.

In addition, the second door unit may further include a guide positioned at a first end of the second door and configured such that the second door is moved along a direction in which the first door is opened, and a rotary portion positioned adjacent to at least a portion of the guide and configured to apply a rotating force to the second door so that the second door is rotated open with respect to the guide when the locking unit is in the released state.

In addition, the control unit may be configured to apply an electric force to the rotary portion with respect to the guide independently of the first door when the locking unit is in the released state.

In addition, the locking unit may further include a housing positioned at the first door unit or the second door unit, a rod positioned in the housing and configured to selectively protrude to a position adjacent to the first door or the second door corresponding to the first door unit or the second door unit, and an insertion portion positioned at the first door or the second door corresponding to the first door unit or the second door unit such that the rod is selectively inserted into the insertion portion.

In addition, the control unit may be configured to control the rod to be inserted into the insertion portion when the first door and the second door are opened together.

Embodiments of the present disclosure may obtain the following effects based on the above embodiments and the configurations, combinations and relations that will be described later.

In embodiments of the present disclosure, the second door is configured to be selectively opened so as to perform the ramp function, so that increased design efficiency of an underfloor is realized.

In addition, embodiments of the present disclosure provide the second door with various types of opening structures, so that increased convenience of a user is realized.

Furthermore, embodiments of the present disclosure provide the second door configured to be opened downward, so that an auxiliary foothold for a vulnerable user is provided, thereby realizing increased convenience of entering and exiting.

BRIEF DESCRIPTION OF THE DRAWINGS

The above and other objectives, features, and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Hereinafter, embodiments of the present disclosure will be described in more detail with reference to the accompanying drawings. The embodiments of the present disclosure may be modified in various forms, and the scope of the present disclosure should not be construed as being limited to the following embodiments. These embodiments are provided to more fully explain the present disclosure to those skilled in the art.

In addition, the terms such as "portion", "unit", and "module" described in the specification indicate a unit for processing at least one function or operation, which may be implemented by hardware, software, or a combination thereof.

In addition, some of the components are called a first, a second, etc., throughout the detailed descriptions in an effort to distinguish such components from one another because they have the same configurations, but in the description below, such a sequence is not limiting.

In addition, the terms "door unit" and "door" may indicate a same configuration, or the term "door" may be used as a lower-level concept of the term "door unit". The door unit may include a frame formed on an outside of the door, and the door unit includes not only the door but also a configuration that is able to be moved together with the door.

Hereinafter, exemplary embodiments are described in detail with reference to the accompanying drawings. Like reference numerals are used for like or corresponding elements when a description is made with reference to the drawings, and repeated descriptions thereof are omitted.

Embodiments of the present disclosure relate to a vehicle door opening structure, and provide a second door unit 200 that is capable of performing a ramp function, so that a vehicle door opening structure that is able to be opened independently or together with a first door unit 100 is provided.

Furthermore, a first door 110 of the first door unit 100 in embodiments of the present disclosure is positioned at an upper end with respect to a second door 210 of the second door unit 200, and the second door 210 is configured at a position adjacent to a bottom surface of a vehicle body 600. In an embodiment, the first door unit 100 and the second door unit 200 that are positioned at one side of a vehicle will be explained.

Figure 1A:
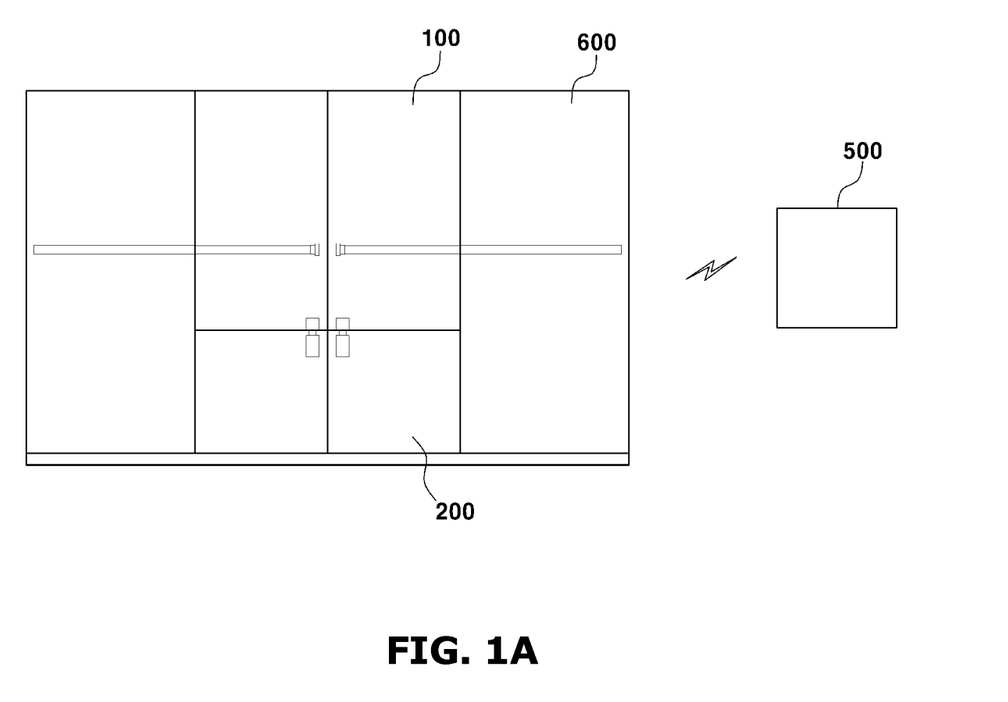
FIG. 1A is a front view illustrating a vehicle door opening structure according to an embodiment of the present disclosure, the structure including a door positioned at a side surface of a vehicle.
Figure 1B:
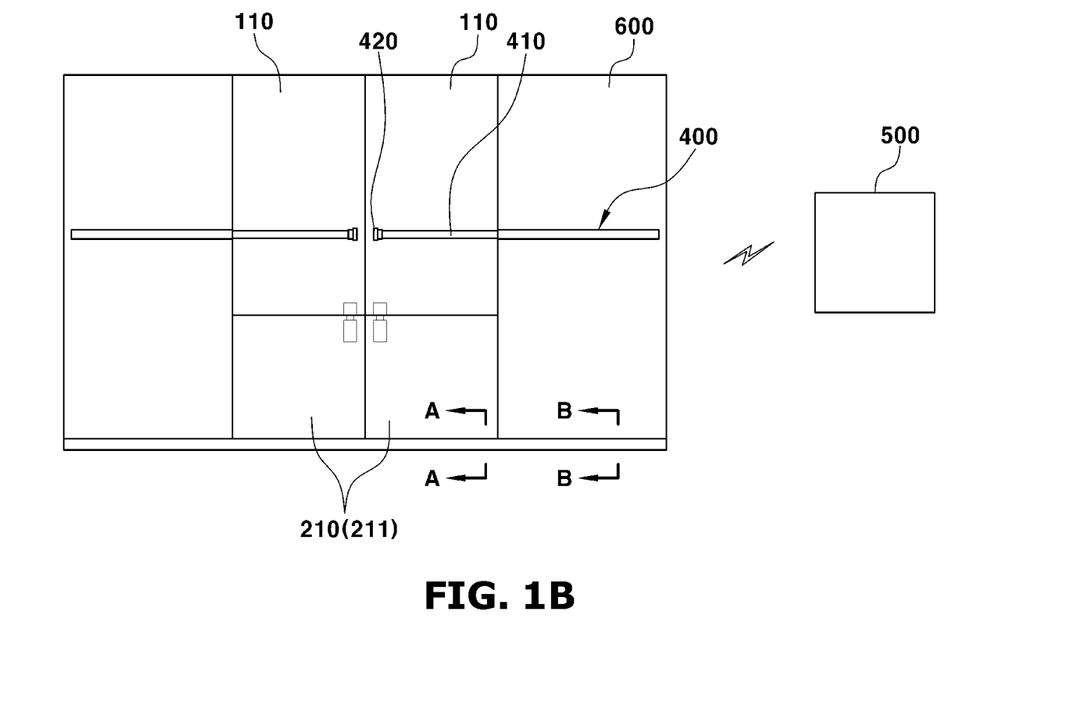
FIG. 1B is a rear view illustrating the vehicle door opening structure according to an embodiment of the present disclosure, the structure including the door positioned at the side surface of the vehicle.

FIG. 1A is a front view illustrating the first door unit 100 and the second door unit 200 according to an embodiment of the present disclosure, and FIG. 1B is a rear view illustrating the first door unit 100 and the second door unit 200 according to an embodiment of the present disclosure.

As illustrated, the first door unit 100 is configured to include the first door 110 and is configured to be positioned at at least a portion of an upper portion of the side surface of the vehicle to cover at least a portion of an opening portion of the vehicle, and the second door unit 200 is configured to be positioned at a lower end of the first door 110. The second door unit 200 includes the second door 210 positioned at a lower portion of the first door 110 so as to be configured to cover a remaining opening surface of the opening portion of the vehicle.

The first door unit 100 may be configured to include a driving unit 400 which is fastened with the first door 110 and applies a driving force to a direction in which the first door 110 is sliding, and a fixing portion 420 at which the driving unit 400 and the first door 110 are fastened.

In an embodiment of the present disclosure, the driving unit 400 may be a spindle 410 configured such that a first end thereof is positioned at the first door 110 and a second end thereof is fixed to a first end of an inside of the vehicle. The first end of the spindle 410 fixed to the fixing portion 420 includes a holding protrusion 430, so that the first door 110 is configured to move together with the spindle 410 to the same moving direction of the spindle 410 while being fixed with the fixing portion 420.

The first door 110 is configured to be slidably inserted into a space between the vehicle body 600 and a vehicle interior material 800 by moving along the side surface of the vehicle adjacent to the first door 110 via the driving unit 400, so that the first door 110 is opened. In an embodiment, a bidirectional opening structure is included. More preferably, the first door no is configured such that at least a portion of the first door 110 is positioned at the space between the vehicle body 600 and the vehicle interior material 800 when the first door 110 is in an opened state and a closed state.

The second door unit 200 includes the second door 210, and the second door 210 is configured to be positioned adjacent to a lower surface of the first door 110. A side surface of the second door 210 may be positioned adjacent to a space between the vehicle body 600 and the vehicle interior material 800, and the second door 210 may be configured to be slidably opened in the same moving direction as the first door 110 when the second door 210 is opened together with the first door 110. Furthermore, when fixation between the first door unit 100 and the second door unit 200 is released, the second door 210 may be independently rotated open with respect to a lower first end of the vehicle body 600.

That is, in the closed state, the second door 210 may be detached from the vehicle body 600 positioned at opposite side surfaces of the second door 210, so that the second door 210 may be independently moved in such a manner that the upper end of the second door 210 is rotated open with respect to the lower portion of the vehicle body 600.

The second door 210 is rotated open in response to an opening condition of the vehicle or a request of a user, such that a sloped surface having a predetermined angle with an underfloor 700 of the vehicle is provided. In an embodiment of the present disclosure, when the second door 210 is independently opened, the second door 210 may perform the ramp function.

The first door unit 100 and the second door unit 200 may be moved together by being interlocked together by a locking unit 300, and the first door unit 100 and the second door unit 200 are configured to perform an independent behavior when the interlocking of the locking unit 300 is released.

The first door 110 is configured to be fastened to the driving unit 400 which is extended from the vehicle body 600 and applies the driving force to the first door 110. In an embodiment of the present disclosure, the driving unit 400 may be the spindle 410 which is positioned at a direction in which the first door 110 is moved. More preferably, the driving unit 400 may be configured to be fixed with the first door unit 100 via the fixing portion 420 which is positioned at a rear surface of the first door 110. The fixing portion 420 may be configured in a clamp shape, and in an embodiment of the present disclosure, the first end of the spindle 410 may be configured to be fastened to and positioned at the clamp.

The control unit 500 may control the driving force of the driving unit 400 which is positioned at the first door unit 100, and the control unit 500 may also control a drive of the locking unit 300 which is positioned between the first door unit 100 and the second door unit 200.

The second door unit 200 includes the second door 210, a guide portion 220, and a rotary portion 230. The second door 210 is extended and positioned at the lower end of the first door 110, the guide portion 220 is fastened with the second door 210 and is configured to have a shape along a direction that actually corresponds to a moving direction of the driving unit 400 between the vehicle body 600 and the vehicle interior material 800, and the rotary portion 230 is configured to be in contact with the second door 210 and is configured to perform the independent rotating open of the second door 210 when the fixation between the first door 110 and the second door 210 is released.

The control unit 500 performs a drive of the rotary portion 230 in response to the request of a user when the fixation between the first door 110 and the second door 210 via the locking unit 300 is released, so that the second door 210 is configured to be rotated open with respect to the guide portion 220 independently of the first door unit 100.

The second door 210 configured to be rotated open is configured such that the upper end of the second door 210 is to be in contact with the ground, so that the predetermined sloped area that is from the ground to the underfloor 700 inside the vehicle may be provided to a passenger. That is, the independently opened second door 210 is configured to perform the ramp function along the floor surface of the vehicle body 600.

Figure 1C:
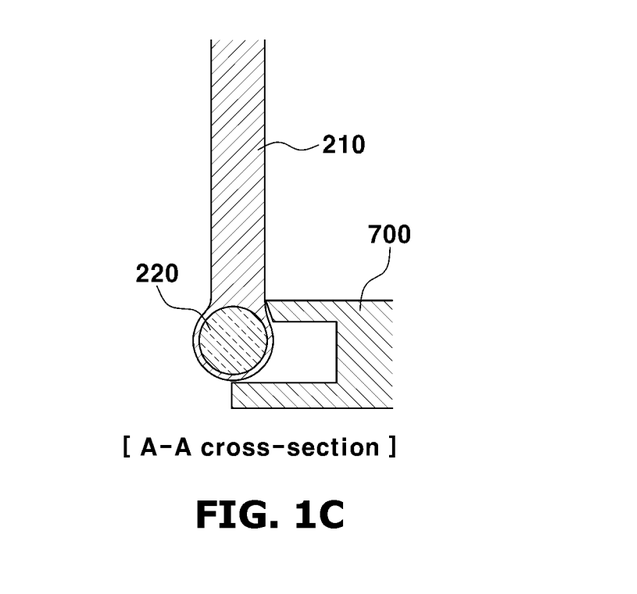
FIG. 1C is a cross-sectional side view of an embodiment of the present disclosure, which illustrates an A-A cross-section of a portion to which a second door is fastened.
Figure 1D:
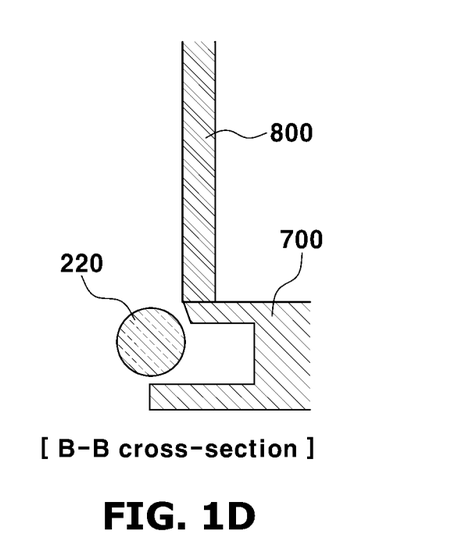
FIG. 1D is a cross-sectional side view of an embodiment of the present disclosure, which illustrates a B-B cross-section of a portion adjacent to the second door.

FIG. 1C is a sectional view taken along line A-A of FIG. 1B, and FIG. 1D is a sectional view taken along line B-B of FIG. 1B.

As illustrated in FIG. 1C, in a fully closed state, the lower end of the second door 210 is configured to cover at least a portion of the guide portion 220, so that the second door 210 is configured to be positioned at the opening surface of the vehicle together with the first door 110. The guide portion 220 is positioned between an outermost surface of the vehicle body 600 and the vehicle interior material 800, and is extended in a direction in which the second door 210 is slidably opened. More preferably, the guide portion 220 is configured to have a length at least longer than a length that the second door 210 is slidably opened. Furthermore, the guide portion 220 is configured to be extended in a direction that corresponds to the moving direction of the driving unit 400 which is fastened to the first door 110.

In summary, when the second door 210 is moved together with the first door 110 by the locking unit 300, the second door 210 is configured to be moved along a longitudinal direction of the guide portion 220 that is positioned at the lower surface of the second door 210 and configured to be covered with at least a portion of the second door 210. That is, the guide portion 220 is configured to be extended in a direction that corresponds to the slidably open direction of the first door unit 100, and is positioned at the lower end of the second door 210 so as to be configured to guide the second door 210 to the slidably open direction. The guide portion 220 may be configured to be positioned at an end of the vehicle body 600 frame, and is configured to guide the second door 210, which is moved together with the first door 110, to move along the longitudinal direction of the guide portion 220, and is configured to perform as a central axis around which the second door 210 is rotated open independently of the first door 110.

Figure 2:
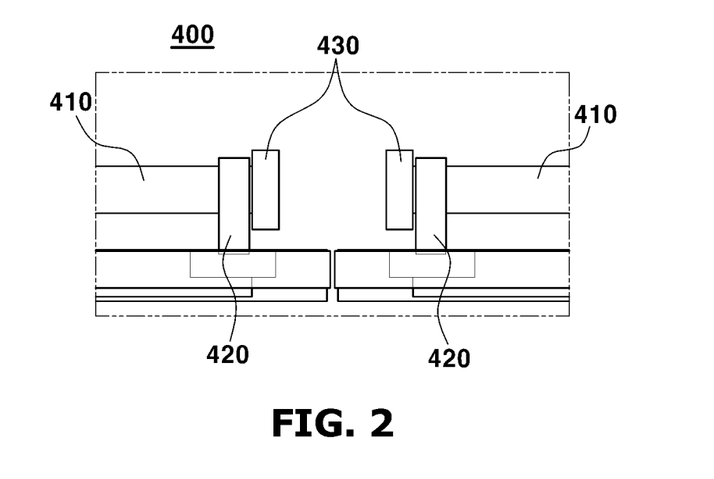
FIG. 2 is a view illustrating a coupling relationship of a driving unit according to an embodiment of the present disclosure.

FIG. 2 is a view illustrating a first end of the driving unit 400 positioned at the first door unit 100 according to an embodiment of the present disclosure.

The first door 110 is configured such that the first door 110 is fastened with the driving unit 400 on a first surface facing the inside of the vehicle, and is configured to move in response to a longitudinal directional movement of the driving unit 400. The first end of the driving unit 400 is configured to be fastened to the first door 110 by being fixed to the fixing portion 420 which is positioned at the first door 110, so that the holding protrusion 430 positioned at the first end of the driving unit 400 is configured to be fixed to the fixing portion 420. The fixing portion 420 may be configured of a clamp, so that the fixing portion 420 of the driving unit 400 is configured to fix the first end of the spindle 410. Therefore, the first door unit 100 is configured such that the first door 110 is switched to the opened state or the closed state in response to the longitudinal directional movement of the driving unit 400.

In addition, the second door 210 fastened with the first door unit 100 by the locking unit 300 may be switched to the opened state or the closed state together with the first door unit 100 by the driving force of the driving unit 400.

Figure 3A:
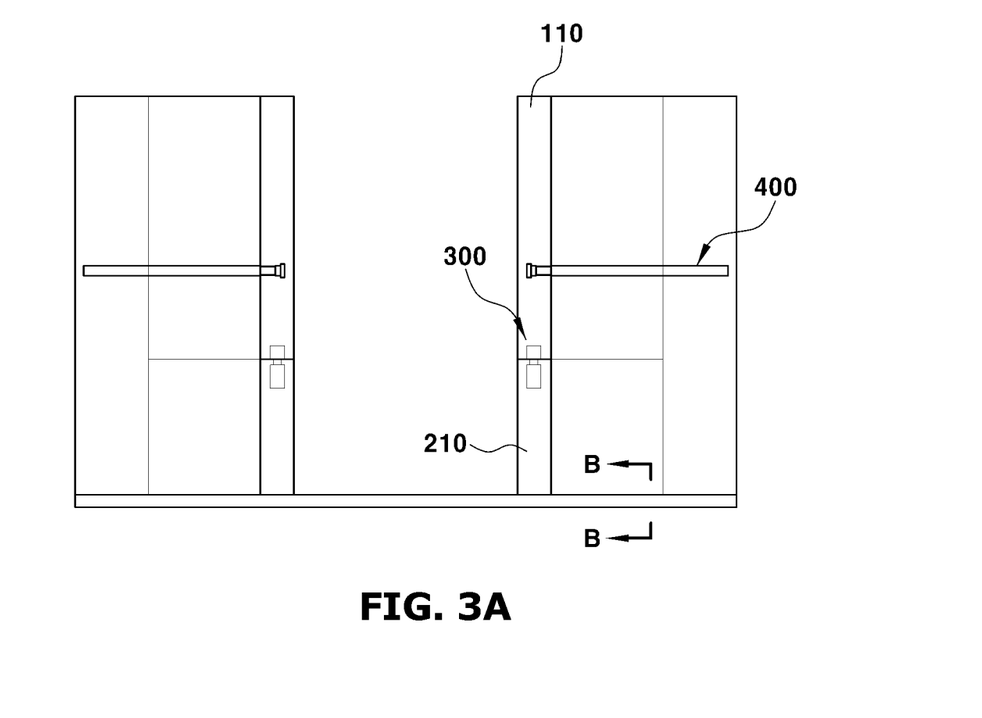
FIG. 3A is a view illustrating a state in which a first door and a second door are opened together according to an embodiment of the present disclosure.

FIG. 3A is a view illustrating a state in which the second door unit 200 and the first door unit 100 are opened together when the locking unit 300 is fastened to the second door unit 200 and the first door unit 100.

The first door 110 and the second door 210 are moved together along the driving unit 400 when the driving force of the driving unit 400 is applied in the state in which the locking unit 300 is fastened to the first door 110 and the second door 210, thereby switching to the fully opened state or the fully closed state.

Figure 3B:
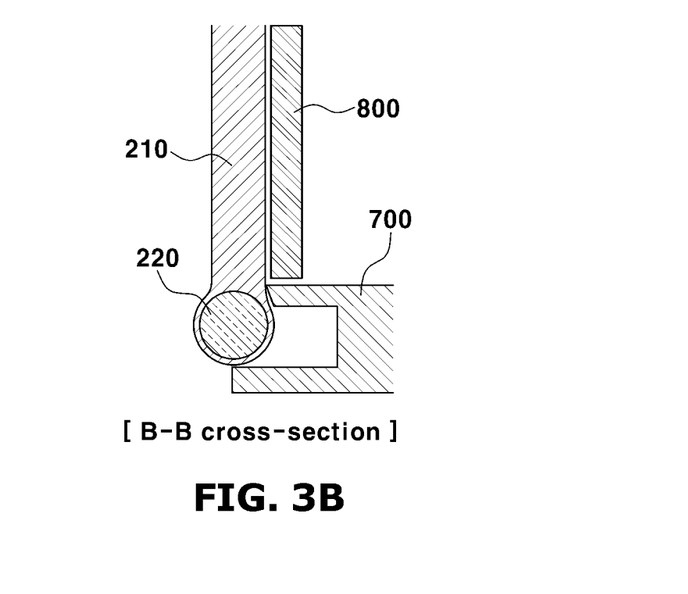
FIG. 3B is a cross-sectional side view of an embodiment of the present disclosure, which illustrates the B-B cross-section in a state in which the second door is opened.

As such, the second door 210 is moved to the inside of the vehicle body 600, so that the second door 210 is inserted into and positioned at the inside of the vehicle body 600 along the guide portion 220 as illustrated in FIG. 3B. For example, the guide portion 220 is fixed to the vehicle body 600 and positioned at the lower end of the second door 210. The guide portion 220 is configured to be positioned between an outer surface of the vehicle body 600 and the vehicle interior material 800, so that the second door 210 is configured to be slidably moved together with the first door 110.

That is, in accordance with a fastened state of the locking unit 300, the first door 110 and the second door 210 may be configured to be opened together or independently.

FIG. 3B is a cross-sectional side view illustrating a state in which the second door 210 is opened. As illustrated in FIG. 3B, the second door 210 is positioned along the guide portion 220 adjacent to the underfloor 700. The second door 210 is configured to be moved to a position facing the vehicle interior material 800 with a state adjacent to the underfloor 700.

Figure 4A:
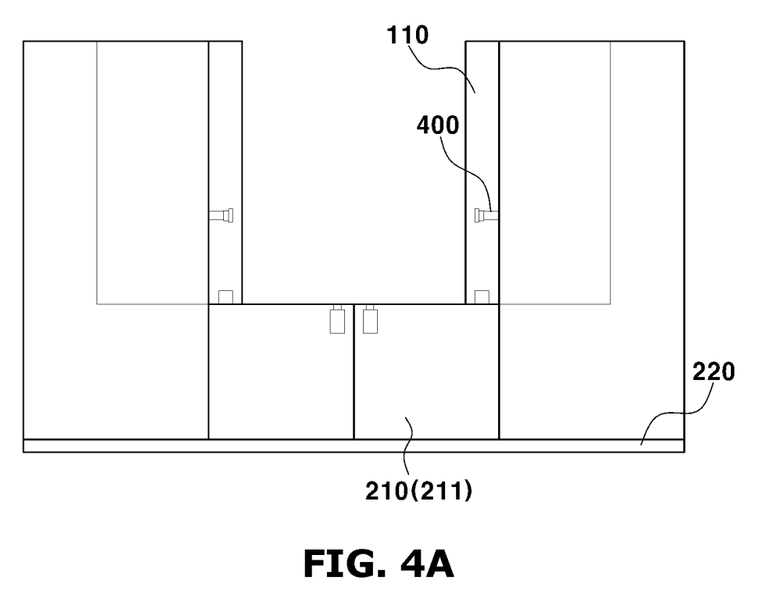
FIG. 4A is a view illustrating a state in which a first door is opened according to an embodiment of the present disclosure.
Figure 4B:
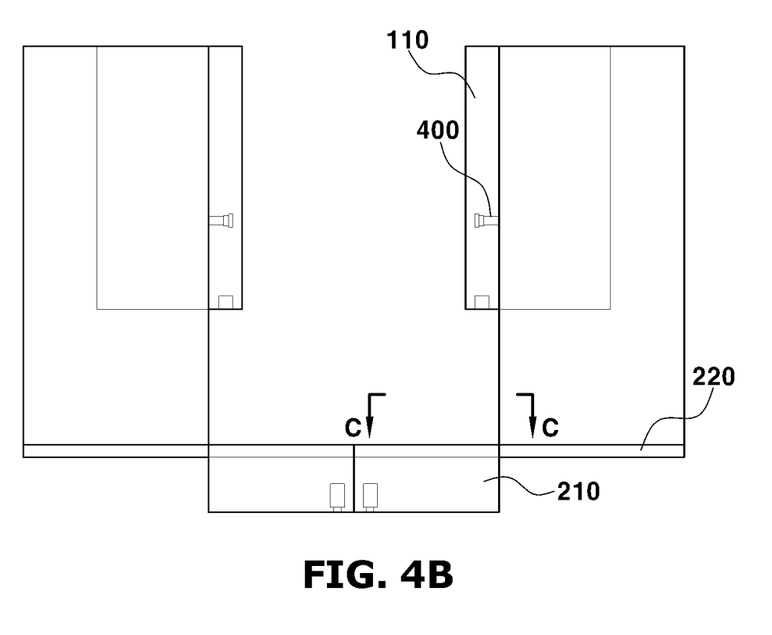
FIG. 4B is a view illustrating a state in which each of the first door and a second door are independently opened according to an embodiment of the present disclosure.

FIG. 4A is a view illustrating a state in which the first door 110 is slidably open and the second door 210 is closed at a state where the locking unit 300 is released, and FIG. 4B is a view illustrating a state in which the first door 110 is slidably open and the second door 210 is rotated open at a state where the locking unit 300 is released.

When a user request to open the door is applied, a signal to open the first door 110 is applied at a state where the locking unit 300 is released by the control unit 500, and the driving unit 400 applies the driving force to the first door 110 so that the first door 110 is inserted into a space that is inside the vehicle body 600 on the side surface of the first door 110.

The second door 210 from which the locking unit 300 is released is configured to be moved independently of the first door 110 even when the first door 110 is switched to the opened state. The second door 210 may remain in the closed state as illustrated in FIG. 4A, and also may be configured such that the driving force of the rotary portion 230 is applied to the lower end of the second door 210 so that the second door 210 is to be rotated open around the guide portion 220 as illustrated in FIG. 4B. The second door 210 is configured such that the second door 210 is opened to have the predetermined sloped area that is from the underfloor 700 inside the vehicle body 600 when the second door 210 is rotated open by a rotating force of the rotary portion 230 with respect to the guide portion 220 that is positioned at the lower end of the vehicle body 600.

The rotary portion 230 may be configured to be positioned adjacent to the guide portion 220, and more preferably, at least a portion of the second door 210 may be configured to be positioned between the rotary portion 230 and the guide portion 220. The rotary portion 230 is configured to apply the rotating force to the second door 210 by the control unit 500, so that the second door 210 is configured to be rotated open when the locking unit 300 is released.

Figure 5A:
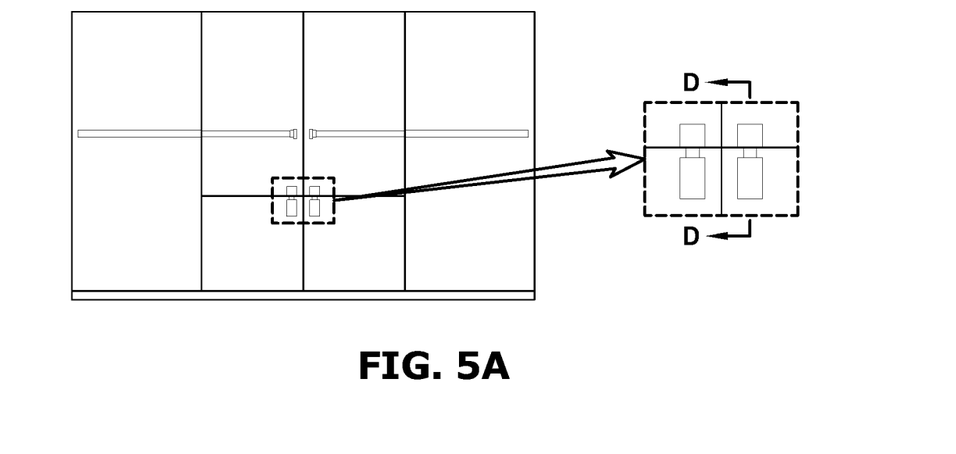
FIG. 5A is a view illustrating a configuration of a locking unit according to an embodiment of the present disclosure.
Figure 5B:
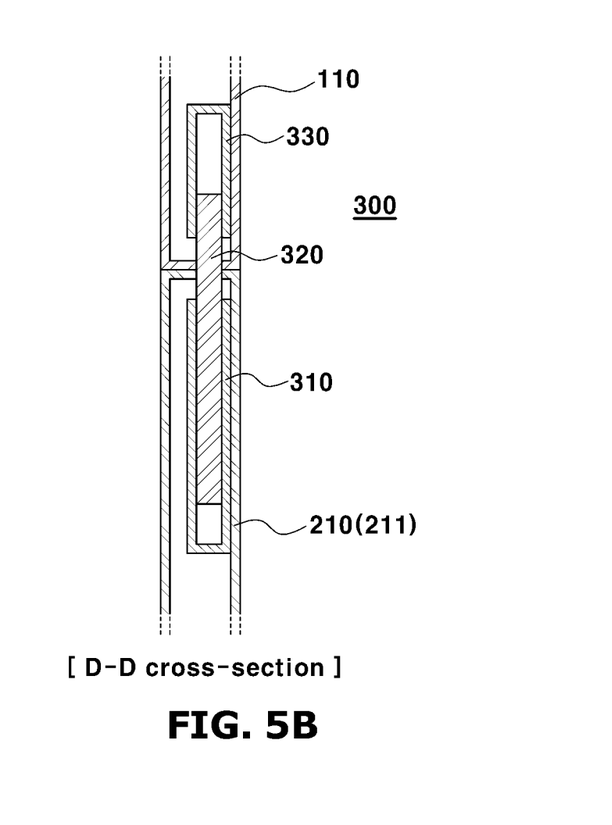
FIG. 5B is a cross-sectional side view of an embodiment of the present disclosure, which illustrates a D-D cross section of the locking unit.

FIGS. 5A and 5B are views illustrating a configuration of the locking unit 300 via the D-D cross-section of FIG. 5A.

As illustrated, the locking unit 300 is configured to be positioned at a position where the first door 110 and the second door 210 are adjacent to each other, so that the locking unit 300 of embodiments of the present disclosure includes a housing 310, a rod 320, and an insertion portion 330. The housing 310 is positioned at the second door 210, the rod 320 is positioned in an inside of the housing 310 and configured to protrude to an upper end which is facing the first door 110, and the insertion portion 330 is positioned at the first door 110 so that the rod 320 is to be inserted into the insertion portion 330.

In another embodiment of the present disclosure, a housing positioned at the first door 110 may be included, and a rod which is to be inserted into the inside of the housing 310 may be positioned at the second door 210.

In embodiments of the present disclosure, the housing 310 may be a gas cylinder, so that the rod 320 may be controlled to protrude to the outside of the housing 310 by a pressure of the gas cylinder. The control unit 500 is configured to control the pressure inside the housing 310, so that the control unit 500 controls a fastened state between the first door 110 and the second door 210 by setting a state whether the rod 320 protrudes or not. More preferably, the control unit 500 is configured to control the pressure inside the housing 310 by controlling an opening and closing of a pipe that is connected to the housing 310 which may be a gas cylinder.

The first door 110 and the second door 210 are configured to be opened or closed together when the rod 320 is inserted into and fixed to the insertion portion 330 by the control unit 500, and the first door 110 and the second door 210 are configured to be opened or closed independently when the rod 320 is separated from the insertion portion 330.

Figure 6A:
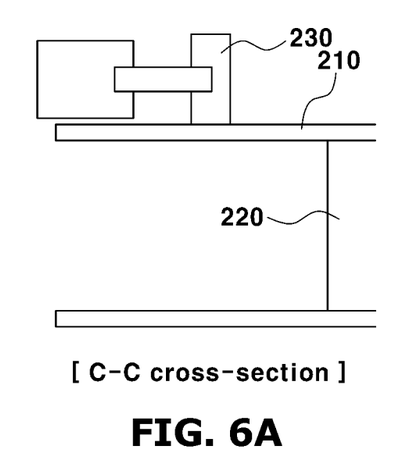
FIG. 6A is a cross-sectional side view of an embodiment of the present disclosure, which illustrates a C-C cross-section of a rotary portion.
Figure 6B:
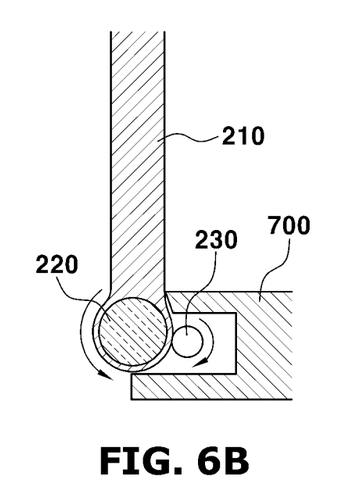
FIG. 6B is a cross-sectional side view of an embodiment of the present disclosure, which illustrates the rotary portion.

FIG. 6A is a sectional view taken along line C-C of FIG. 4B, and FIG. 6B is a view illustrating an assembled state of the rotary portion 230 which is configured to be in contact with the first end of the second door 210.

As illustrated, the second door 210 is configured to be fixed with the guide portion 220 which is positioned at the lower end of the vehicle body 600, and the rotary portion 230 is configured to be adjacent to the guide portion 220 so as to be in contact with the lower end of the second door 210. More preferably, the rotary portion 230 is configured to be in contact with the lower end of the second door 210 in the closed state, and the control unit 500 may be configured such that the rotary portion 230 is rotated when the locking unit 300 is released.

The rotary portion 230 includes a motor and is configured such that a rotating force of the motor is applied to the second door 210, so that the second door 210 is configured to be rotated open with respect to the guide portion 220 by the rotating force of the rotary portion 230. More preferably, the rotary portion 230 is positioned at the lower surface of the underfloor 700 of the vehicle body 600 and is positioned adjacent to the guide portion 220, so that the rotary portion 230 may be configured to be fastened to the lower end of the second door 210 when the second door 210 is closed.

The control unit 500 is configured to control the rotating force of the rotary portion 230 so that the upper end of the second door 210 is downwardly rotated open with respect to the lower end of the second door 210 when the locking unit 300 is released. More preferably, the second door 210 is configured to be rotated open with respect to the guide portion 220 which is positioned at the lower end of the second door 210.

The above-described detailed descriptions are only examples of embodiments of the present disclosure. In addition, the above-described descriptions have described exemplary embodiments of the present disclosure, and the present disclosure may be used in various other combinations, modifications, and environment. That is, embodiments of the present disclosure may be changed and modified in a range of the concept and in an equivalent range of the content of the disclosure disclosed in the present specification and/or in technology or knowledge in the art. The described embodiments describe the best state for implementing the concept of the present disclosure, and various modifications required for applying the present disclosure to specific fields and uses may be possible. Accordingly, the above-described detailed description of embodiments of the present disclosure does not limit the present disclosure to the embodiments disclosed. In addition, the appended claims should be interpreted to include other embodiments.

What is claimed is:

1. A vehicle door opening structure, the structure comprising:
   a first door unit positioned at a side of a vehicle and including a first door;
   a second door unit including a second door positioned adjacent to the first door and a guide positioned at a first end of the second door, wherein the second door is configured to be moved along the guide in an opening direction of the first door;
   a locking device configured to selectively lock the first door unit and the second door unit together; and
   a controller configured to fix the locking device so that the first door unit and the second door unit are configured to be opened together or to release the locking device so that the first door unit and the second door unit are configured to be opened independently.

2. The structure of claim 1, wherein the second door unit further comprises a rotary portion positioned adjacent to a portion of the guide and configured to apply a rotating force to the second door so that the second door is rotated open with respect to the guide when the locking device is in a released state.

3. The structure of claim 2, wherein the controller is configured to apply an electric force to the rotary portion so that the second door is rotated open with respect to the guide independently of the first door when the locking device is in the released state.

4. The structure of claim 1, wherein the locking device further comprises:
   a housing positioned at the first door unit;
   a rod positioned in the housing and configured to selectively protrude to a position adjacent to the first door corresponding to the first door unit; and
   an insertion portion positioned at the second door corresponding to the second door unit, wherein the rod is configured to be selectively inserted into the insertion portion.

5. The structure of claim 4, wherein the controller is configured to control the rod to be inserted into the insertion portion when the first door and the second door are opened together.

6. The structure of claim 1, wherein the locking device further comprises:
   a housing positioned at the second door unit;
   a rod positioned in the housing and configured to selectively protrude to a position adjacent to the second door corresponding to the second door unit; and
   an insertion portion positioned at the first door corresponding to the first door unit, wherein the rod is configured to be selectively inserted into the insertion portion.

7. The structure of claim 6, wherein the controller is configured to control the rod to be inserted into the insertion portion when the first door and the second door are opened together.

8. A vehicle door opening structure, the structure comprising:
   a first door unit positioned at a side of a vehicle, the first door unit comprising:
      a first door; and
      a driving unit fastened to the first door and configured to perform a movement in a longitudinal direction of the driving unit;
   a second door unit comprising a second door positioned adjacent to the first door;
   a locking device configured to selectively lock the first door unit and the second door unit together; and
   a controller configured to fix the locking device so that the first door unit and the second door unit are configured to be opened together or to release the locking device so that the first door unit and the second door unit are configured to be opened independently.

9. The structure of claim 8, wherein the driving unit further comprises:
   a spindle positioned at a vehicle body of the vehicle, wherein a first end of the spindle is fastened to a rear surface of the first door; and
   a fixing portion to fix the spindle to the first door.

10. The structure of claim 8, wherein the first door and the second door are configured to be opened together when the driving unit is driven while the locking device is in a locked state.

11. The structure of claim 8, wherein the first door is configured to be opened independently from the second door when the driving unit is driven while the locking device is in a released state.

12. A vehicle comprising:
   a vehicle body including an opening at a side or rear of the vehicle body;
   a first door unit coupled to the vehicle body at the opening of the vehicle body, the first door unit including a first door;
   a second door unit including a second door positioned below and adjacent to the first door and a guide positioned at a first end of the second door, wherein the second door is configured to be moved along the guide in an opening direction of the first door;
   a locking device configured to selectively couple the first door unit and the second door unit together; and
   a controller configured to fix the locking device in a locked state in which the first door unit and the second door unit are configured to be opened together or in a released state in which the first door unit and the second door unit are configured to be opened independently.

13. The vehicle of claim 12, wherein the first door unit further comprises a driving unit fastened to the first door and configured to perform a movement in a longitudinal direction of the driving unit.

14. The vehicle of claim 13, wherein the driving unit further comprises:
   a spindle positioned at the vehicle body, wherein a first end of the spindle is fastened to a rear surface of the first door; and
   a fixing portion configured to fix the spindle to the first door.

15. The vehicle of claim 13, wherein the first door and the second door are configured to be opened together when the driving unit is driven while the locking device is in the locked state.

16. The vehicle of claim 13, wherein the first door is configured to be opened independently from the second door when the driving unit is driven while the locking device is in the released state.

17. The vehicle of claim 12, wherein the second door unit further comprises a rotary portion positioned adjacent to a portion of the guide and configured to apply a rotating force to the second door so that the second door is rotated open with respect to the guide when the locking device is in the released state.

18. The vehicle of claim 17, wherein the controller is configured to apply an electric force to the rotary portion so that the second door is rotated open with respect to the guide independently of the first door when the locking device is in the released state.

19. The vehicle of claim 12, wherein the locking device further comprises:
   a housing positioned at the first door unit;
   a rod positioned in the housing and configured to selectively protrude to a position adjacent to the first door corresponding to the first door unit; and
   an insertion portion positioned at the second door corresponding to the second door unit, wherein the rod is configured to be selectively inserted into the insertion portion; and
   wherein the controller is configured to control the rod to be inserted into the insertion portion when the first door and the second door are opened together.

20. The vehicle of claim 12, wherein the locking device further comprises:
   a housing positioned at the second door unit;
   a rod positioned in the housing and configured to selectively protrude to a position adjacent to the second door corresponding to the second door unit; and
   an insertion portion positioned at the first door corresponding to the first door unit, wherein the rod is configured to be selectively inserted into the insertion portion; and
   wherein the controller is configured to control the rod to be inserted into the insertion portion when the first door and the second door are opened together.

* * * * *

UNITED STATES PATENT AND TRADEMARK OFFICE
CERTIFICATE OF CORRECTION

| | |
|---|---|
| PATENT NO. | : 11,679,652 B2 |
| APPLICATION NO. | : 17/381719 |
| DATED | : June 20, 2023 |
| INVENTOR(S) | : Jae Seung Lee |

It is certified that error appears in the above-identified patent and that said Letters Patent is hereby corrected as shown below:

On the Title Page

Item (73), in Column 1, in "Assignees", Line 2, delete "Corporotion," and insert -- Corporation, --.

Signed and Sealed this
Twelfth Day of September, 2023

Katherine Kelly Vidal
*Director of the United States Patent and Trademark Office*